United States Patent [19]
Winter

[11] Patent Number: 5,894,610
[45] Date of Patent: *Apr. 20, 1999

[54] SHOWER ROD MOUNTING ASSEMBLY

[75] Inventor: Paul Henry Winter, Wilmington, Del.

[73] Assignee: Zenith Products Corp., New Castle, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/777,713

[22] Filed: Dec. 20, 1996

[51] Int. Cl.$^6$ ............................................. A47K 3/00
[52] U.S. Cl. ........................ 4/558; 285/46; 403/263; 403/334; 4/610
[58] Field of Search .................. 4/558, 608, 610; 211/123, 105.1; 248/200.1, 201, 357; 285/46; 137/359; D8/350, 351, 352; 403/263, 334, 373

[56] References Cited

U.S. PATENT DOCUMENTS

| | | |
|---|---|---|
| 328,562 | 10/1885 | Beckman . |
| 438,109 | 10/1890 | Jones . |
| 750,343 | 1/1904 | Brockway ............................. 403/334 |
| 753,202 | 2/1904 | Meyer . |
| 805,570 | 11/1905 | Maldaner . |
| 1,062,478 | 5/1913 | Kroder . |
| 1,299,556 | 4/1919 | Crecelius . |
| 1,693,848 | 12/1928 | Kyle ..................................... 403/334 |
| 1,726,948 | 8/1929 | Downs . |
| 2,199,851 | 5/1940 | Culver . |
| 2,215,331 | 9/1940 | Marsh . |
| 2,402,127 | 6/1946 | Cohn ..................................... 211/123 |
| 2,778,030 | 1/1957 | Goche . |
| 3,193,228 | 7/1965 | Chion . |
| 3,880,536 | 4/1975 | Petrus ................................... 403/373 |
| 4,209,099 | 6/1980 | Wickes ................................. 211/123 |
| 4,385,409 | 5/1983 | File et al. . |
| 4,562,964 | 1/1986 | Diamond .............................. D8/352 |
| 4,653,714 | 3/1987 | Andrasko, Jr. . |
| 4,754,504 | 7/1988 | Cellini . |
| 4,989,519 | 2/1991 | Welsch et al. ........................ 403/334 |
| 5,022,104 | 6/1991 | Miller . |
| 5,236,229 | 8/1993 | Gonzalez .............................. 285/46 |

FOREIGN PATENT DOCUMENTS

| | | | |
|---|---|---|---|
| 2055-100 | 2/1990 | Japan | 211/123 |

*Primary Examiner*—Charles R. Eloshway
*Attorney, Agent, or Firm*—Edgar A. Zarins; Leon E. Redman

[57] ABSTRACT

A shower rod mounting assembly for conveniently securing a shower rod between opposing walls of a bath while maintaining an appealing appearance. The assembly consists of a mounting bracket which can be secured to the wall and includes a pair of coaxial tubular flanges fo receiving a shower rod. A snap-on escutcheon conceals the mounting bracket. After mounting the brackets to the opposing walls of the bath, the ends of the shower rod are inserted into the brackets such that the inner flange is matingly received within the shower rod and the shower rod is matingly received within the outer flange of the bracket. The gap between the tubular flanges is configured to snugly receive the shower rod. The escutcheons can now be positioned over the brackets completing assembly of the shower rod.

6 Claims, 1 Drawing Sheet

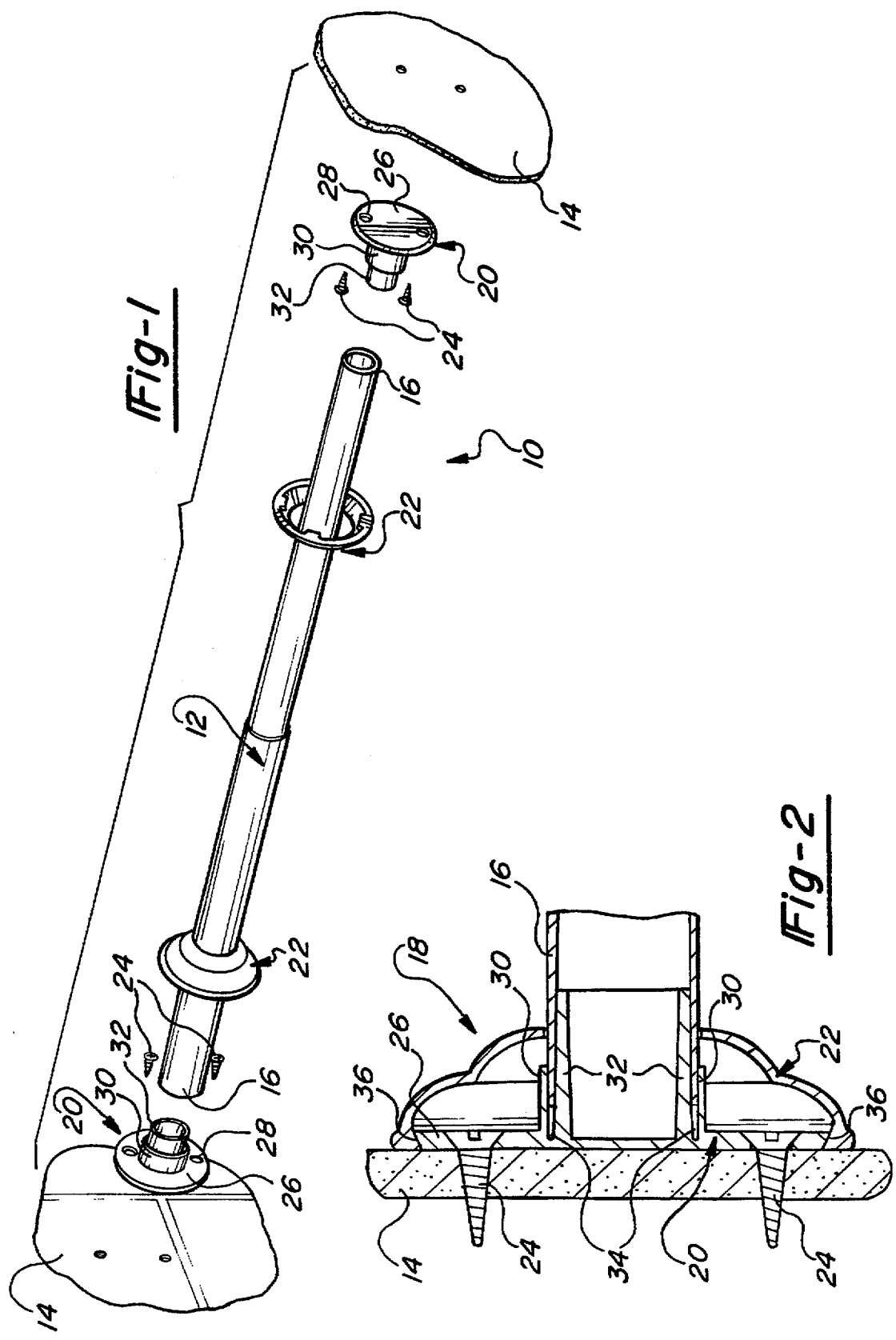

SHOWER ROD MOUNTING ASSEMBLY

BACKGROUND OF THE INVENTION

I. Field of The Invention

This invention relates to a shower rod mounting assembly and, in particular, to mounting brackets having coaxial flanges for frictionally receiving the shower rod to prevent separation therefrom.

II. Description of the Prior Art

In order to support a shower curtain to selectively provide privacy within a bath or shower, a shower rod is typically mounted across the opening to the bath/shower. The shower rod is mounted horizontally across the opening and the shower curtain is hung from the rod using rings or hooks. As necessary the shower curtain can be opened or closed by sliding the rings or hooks along the shower rod.

While fixedly mounted shower rods are available, manufacturers have developed adjustable rods which can accommodate variances in the bath opening. Typically some type of telescopic adjustment allows the length to be varied to the desired dimension. In order to secure the rod to the opposing walls of the bath following adjustment, end brackets are provided. In some shower rod assemblies, the brackets are fixed to the shower rod requiring that they be fastened to the walls following adjustment of the rod. However, it is more convenient to mount the brackets independently without the rod in the way which requires that the rod be thereafter secured to the brackets. A wide variety of means have been used to secure the rod to the brackets but all require special fasteners or additional brackets thereby increasing the cost of manufacturing and the complexity of assembly.

SUMMARY OF THE PRESENT INVENTION

The present invention overcomes the disadvantages of the prior known shower rod assemblies by providing mounting brackets which frictionally receive the ends of the shower rod while facilitating receipt of a decorative escutcheon to conceal the mounting assembly.

The shower rod mounting assembly of the present invention includes a shower rod which may be of fixed length requiring cutting to the required length or telescopically adjustable to accommodate a variety of bath enclosures. The shower rod assembly is designed to be mounted between opposing walls forming the opening to the bath. The ends of the shower rod are received in mounting brackets used to secure the assembly to the walls. The brackets include a planar flange which lies flush against the wall and may include apertures for receiving fasteners to secure the bracket to the wall. Disposed perpendicular to the planar flange are a pair of coaxial tubular flanges for engaging the end of the shower rod. The tubular flanges have different diameters thereby forming a gap between the tubes. The inner tubular flange is matingly received within the end of the shower rod while the shower rod is matingly received within the outer tube. As a result, the shower rod end is seated within the gap between the coaxial tubular flanges frictionally attaching the mounting brackets to the shower rod. The snug fit of the end of the shower rod within the gap ensures that the shower rod will remain attached to the brackets. In order to conceal the mounting brackets, an escutcheon is provided which snaps over the mounting bracket.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is an exploded view of a shower rod mounting assembly embodying the present invention; and FIG. 2 is an enlarged cross-sectional view of a mounting bracket of the shower rod assembly.

DETAILED DESCRIPTION OF A PREFERRED EMBODIMENT OF THE PRESENT INVENTION

Referring first to FIG. 1 of the drawing, there is shown a shower rod assembly 10 for mounting a shower rod 12 between opposing walls 14 defining an opening for the shower or bath (not shown). The shower rod 12 is used to hang a shower curtain (not shown) across the bath/shower opening. The curtain will be attached to the shower rod 12 using hooks or rings which can be slid along the rod 12 to extend or compact the shower curtain as desired. Although the present invention will be described in connection with a shower, it is to be understood that the shower rod assembly 10 can accommodate shower or bath openings of various widths.

Referring now to FIGS. 1 and 2, the shower rod 12 may be mechanically adjustable in length or cut to length to fit between the walls 14. Attached to the ends 16 of the shower rod 12 is a mounting assembly 18. The mounting assembly 18 includes a mounting bracket 20 and a decorative escutcheon 22 for concealing the mounting bracket 20. The mounting brackets 20 are adapted to be secured to the opposing walls 14 using fasteners 24 with the shower rod 12 extending between the brackets 20.

The mounting brackets 20 include a substantially planar base 26 adapted to lie flush up against the wall 14 and having apertures 28 to receive the fasteners 24. Formed perpendicular to the base 26 are a pair of coaxial tubular flanges 30 and 32. An outer tubular flange 30 has an inner diameter greater than the outer diameter of the inner tubular flange 32 thereby forming a gap 34 between the tubes 30 and 32. The tubular flanges 30 and 32 are preferably integrally molded with the base 26 to form an integral bracket 20.

The peripheral edge of the base 26 includes at least a partial chamfer 36 to receive the decorative escutcheon 22. The escutcheon 22 includes a shell 38 and at least one finger 40 for engaging the chamfer 36 of the base 26 to secure the escutcheon 22 onto the bracket 20 thereby concealing the bracket 20 and the end 16 of the shower rod 12.

The shower rod assembly 10 may be mounted to the walls 14 of the bath either by first mounting the brackets 20 and then inserting the adjustable shower rod 12 or by first attaching the brackets 20 to the ends 16 of the shower rod 12 and mounting the entire assembly. The configuration of the bracket 20 facilitates a secure mating engagement between the shower rod 12 and the brackets 20. The end 16 of the shower rod 12 is inserted into the gap 34 between the tubular flanges 30 and 32 such that the inner tubular flange 32 is matingly received within the end 16 of the shower rod 12 and the end 16 of the shower rod 12 is matingly received within the outer tubular flange 30. In a preferred embodiment, the gap 34 reduces in width towards the base 26 to increase the frictional engagement with the shower rod 12 as well as accommodate shower rods 12 with different material thicknesses. With the ends 16 of the shower rod 12 positioned within the brackets 20, the escutcheon 22 can be slid down the rod 12 to engage the bracket 20. The escutcheon 22 is configured to conceal the end brackets 20 while providing a finished appearance to the shower rod assembly 10.

The foregoing detailed description has been given for clearness of understanding only and no unnecessary limitations should be understood therefrom as some modifications will be obvious to those skilled in the art without departing from the scope and spirit of the appended claims.

What is claimed is:

1. A shower rod assembly for hanging a shower curtain across an opening between opposing walls, said shower rod assembly comprising:

a tubular shower rod having a pair of ends; and a pair of mounting brackets adapted to be fastened to the opposing walls, said mounting brackets having an integral construction including a planar base and a pair of coaxial tubular flanges integrally formed with and extending substantially perpendicular to said base in spaced apart relationship, said coaxial tubular flanges forming a gap therebetween, said gap between tubular flanges tapering in width over the length thereof, an inner tubular flange matingly received within an end of said shower rod and an outer tubular flange matingly receiving said end of said shower rod such that a wall of said tubular shower rod is inserted into said gap until frictionally engaging said inner and outer tubular flanges to detachably secure said mounting brackets to said ends of said shower rod.

2. The assembly as defined in claim 1 and further comprising an escutcheon detachably engageable with each of said mounting brackets to conceal said mounting brackets.

3. The assembly as defined in claim 2 wherein said peripheral edge of said bracket base includes a chamfer for lockingly engaging said eschutcheon.

4. The assembly as defined in claim 1 wherein an inner diameter of said outer tubular flange is substantially greater than an outer diameter of said inner tubular flange such that a gap is formed between said inner and outer tubular flanges, said end of said shower rod received within said gap.

5. A shower rod assembly for hanging a shower curtain across an opening between opposing walls, said shower rod assembly comprising:

a tubular shower rod having a pair of ends; a pair of mounting brackets receiving said ends of said shower rod and adapted to be fastened to the opposing walls, said mounting brackets having an integral construction including a planar base and a pair of coaxial tubular flanges integrally formed with and extending perpendicular to said base, an inner tubular flange matingly received within an end of said shower rod and an outer tubular flange spaced outwardly from said inner tubular flange to form a gap therebetween, said outer tubular flange matingly receiving said end of said shower rod, said gap continuously reducing in width over the length of said gap from a first width at an opening to said gap to a reduced second width at an interior end of said gap such that a wall of said shower rod is frictionally disposed between said inner and outer flanges to detachably secure said mounting brackets to said ends of said shower rod; and a pair of escutcheons attachable to said mounting brackets to conceal said mounting brackets.

6. A shower rod assembly for hanging a shower curtain across an opening between opposing walls, said shower rod assembly comprising:

a tubular shower rod having a pair of tubular ends; a pair of mounting brackets receiving said tubular ends of said shower rod and adapted to be fastened to the opposing walls, said mounting brackets having an integral construction including a planar base and a pair of spaced apart coaxial tubular flanges formed with and extending substantially perpendicular to said base, an inner tubular flange matingly received within an end of said shower rod and an outer tubular flange spaced outwardly from said inner tubular flange to form a gap therebetween, said inner and outer flanges converging to reduce a width of said gap continuously over the length of said gap from a first width at an opening to said gap to a reduced second width proximate said base, said outer tubular flange matingly receiving said end of said shower rod such that said shower rod is frictionally captured within a reduced portion of said gap between said inner and outer flanges to detachably secure said mounting brackets to said ends of said shower rod; and a pair of escutcheons attachable to said mounting brackets to conceal said mounting brackets.

\* \* \* \* \*